Feb. 6, 1940.                R. E. KLAGES                2,189,266
                          JOINT CONSTRUCTION
                          Filed Dec. 1, 1937
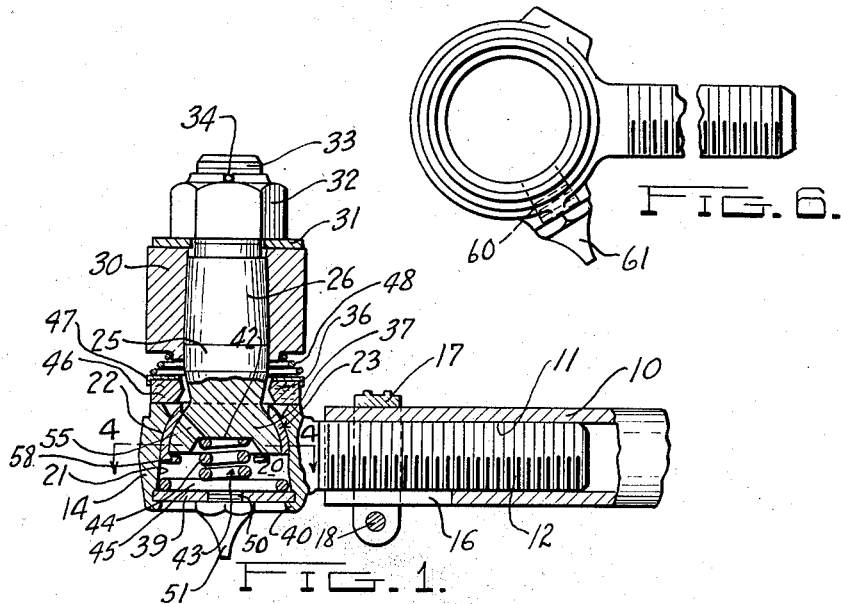
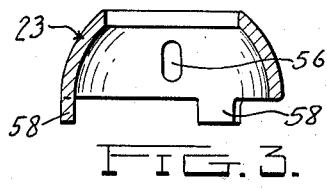
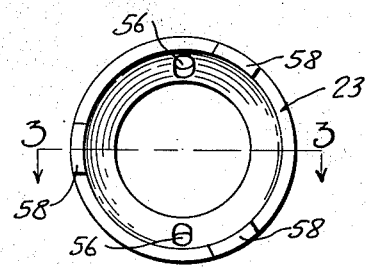
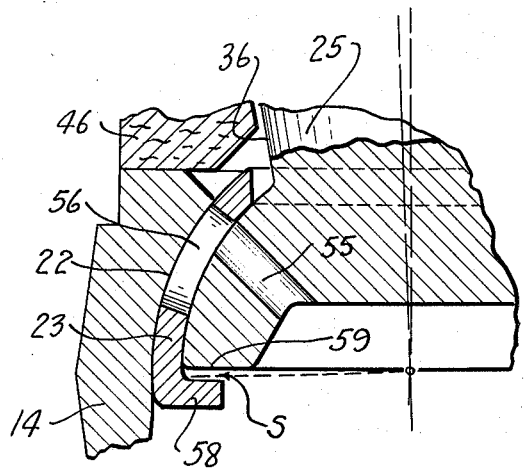
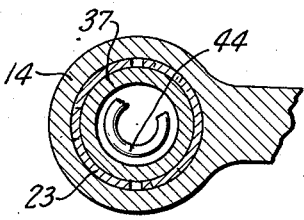
INVENTOR
Reynold E. Klages
BY
Braselton, Whitcomb & Davies
ATTORNEY Patented Feb. 6, 1940

2,189,266

UNITED STATES PATENT OFFICE 2,189,266

JOINT CONSTRUCTION

Reynold E. Klages, Columbus, Ohio, assignor to The Columbus Auto Parts Company, Columbus, Ohio, a corporation of Ohio Application December 1, 1937, Serial No. 177,559

3 Claims. (Cl. 287—90)

This invention relates to joint constructions and is more specifically directed to articulated joints and more especially to ball joints adapted for tie rod and drag link connections used in steering mechanism of automotive vehicles and the like.

The invention contemplates the provision of a joint construction having a bearing seat element having surfaces arranged to cooperate with both the stud member and the joint housing cooperating with resilient means for taking up or compensating for wear of the parts.

The invention embraces the provision of a joint structure of the ball and socket type wherein a bearing seat member is interposed between the ball portion of the joint and the housing whereby both relative tilting and rotary movement of the ball member causes relative movement between one or more sets of bearing surfaces.

Another object of the invention is the provision of a joint structure of the ball and socket type incorporating a bearing seat member so arranged that the wear caused by relative movements of one portion of the joint is distributed over several surfaces whereby normal wear of the several elements is greatly decreased.

Still another object of the invention is the provision of a joint structure wherein a portion of spherical configuration is surrounded by an annular bearing seat or member formed with its inner and outer surfaces of spherical configuration whereby large bearing areas are provided, yet the over all dimensions of the joint materially reduced, the arrangement including a means for automatically maintaining the several elements of the joint structure in proper operating position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a vertical sectional view showing a joint construction of my invention;

Figure 2 is a plan view showing a bearing seat member forming an element of the invention;

Figure 3 is a section taken substantially on the line 3—3 of Figure 2;

Figure 4 is a horizontal sectional view taken substantially on the line 4—4 of Figure 1;

Figure 5 is an enlarged fragmentary detail sectional view illustrating an operation of the joint structure during tilting movements of one of the elements of the joint;

Figure 6 is a view of a joint housing showing a modified form of means for lubricating the joint.

While I have illustrated the joint construction of my invention as especially arranged for a tie rod connection, it is to be understood that I contemplate the use of my invention in any coupling or joint construction wherever the same may be found to have utility.

Referring to the drawing in detail, I have illustrated a form of joint construction in which numeral 10 designates the end portion of a tie rod preferably of tubular formation which is interiorly threaded as at 11 and receiving a threaded tenon 12 formed, in the embodiment illustrated, as an integral extension of the joint housing 14. The end of the tie rod 10 is preferably split longitudinally as at 16 and is surrounded by a clamp or collar 17 adapted to be drawn together by means of a bolt 18 and nut (not shown), this arrangement serving to hold the tie rod 10 and tenon 12 in adjusted relationship.

The longitudinal axis of the threaded tenon 12 in the form shown is substantially at right angles to the axis of passage 20 formed in the housing 14. The passage 20 is preferably formed at its lower portion with a cylindrical wall 21 terminating at its upper portion in a segmental spherical configuration 22. Positioned within the passage or opening 20 in the housing and contacting with the spherically shaped surface 22 thereof is an annular bearing seat or member 23 preferably having its outer and inner surfaces of segmental spherical configuration generated about the same center, the outer surface of the bearing seat member being of a curvature to conform to and fit the spherical surface 22 of the housing.

The joint construction includes a stud member 25 having a tapered shank portion 26 adapted to receive an arm 30 which is connected to one of the steering wheels (not shown) of the vehicle, the arm 30 being held in place by means of a washer 31 and a nut 32 engageable with a threaded tenon 33 formed at the upper end of the stud, the nut being locked in position by means of a cotter key 34. The stud 25 is provided with an inverted frusto-conical portion 36 which terminates in a segmental spherical or ball shaped portion 37. The exterior surface of the ball portion of the stud is arranged to conform to and fit the interior spherically shaped surface of the ball seat or bearing member 23.

The bottom part of the housing is closed by means of a plate 39, the plate being held in place by swaging or distorting an annular edge portion 40 of the housing into the position shown in Figure 1. Interposed between the plate 39 and the stud 25 and fitting into a recess 42 in the stud is an expansive coil spring 43 having its uppermost convolutions 44 of substantially the same diameter, while the lowermost convolution 45 is of a considerably larger diameter, this form of spring serving to maintain a substantially uniform upward pressure upon the stud member irrespective of tilting movements of the stud member.

The coil spring of the special character incorporated in my invention wherein the lowermost convolution is of larger diameter than the others permits a tilting of the stud member, and as the spring is temporarily distorted through such tilting, the small convolutions of the spring may be deflected by the angular movement of the stud and tilted into the space formed by the lowermost large convolution of the spring. Thus, a substantially uniform spring pressure is at all times provided against the stud member during all angular positions of the stud and yet provides ample space for the distortion of the smaller convolutions of the spring during angular movement of the stud. Moreover, the stud may move to various angular positions without any slipping of the spring taking place.

The opening in the housing through which the stud member 25 projects is closed by means of a sealing gasket 46 of felt or other suitable material above which is arranged a metallic washer 47. A spring 48 interposed between the washer 47 and the arm 30 serves to maintain the gasket 23 in engagement with the upper edge portion of the housing 14 and in this manner prevents the escape of lubricant from the joint structure.

In the form of the invention shown in Figure 1, the closure plate 39 is preferably threaded as at 50 to receive a lubricating fitting 51 for injecting lubricant into the interior of the joint structure. In order that the several bearing surfaces may be properly lubricated, it is desirable to provide the lower portion of the stud member with spaced openings 55, there being three in number in the arrangement illustrated, and the bearing seat member provided with openings 56 which at times during the operation of the ball joint will come into registry with the openings 55 in the stud member so that by means of these openings lubricant may be conveyed to the exterior surface of the ball stud, the interior spherical surface of the housing, and the inner and outer surfaces of the bearing seat member.

By this arrangement, adequate lubrication is not only provided for the surface between the spherical portion of the stud member and the inner surface of the seat member but through the injection and retention of lubricant in the elongated openings 56 there is provided adequate lubrication for the exterior surface of the seat members and the interior spherical surface of the housing. Moreover, during operation of the joint structure the seat member 23 may rotate as there is no limiting means for restricting rotation of the same, and thus the openings or slots 56 containing lubricant may take various positions in the housing so that the entire spherical surface in the housing is lubricated which materially increases the life of the joint structure.

It is to be noted that the bearing seat member 23 is provided with spaced inwardly extending ears 58, there being three in number in the embodiment of the invention illustrated, and with particular reference to Figure 5, it is to be noted that there is a space S normally provided between the upper surfaces of the ears 58 and the lower peripheral portion 59 of the stud member. It is also to be noted that the upper peripheral portion of the bearing seat member 23 is spaced away from the vertical inverted frusto-conical portion 36 of the stud member 25 so that during operation of the joint and during tilting movements of the ball stud with respect to the housing, the ball stud may move relative to the bearing seat member 23 until the peripheral portion 59 of the ball portion of the stud engages or contacts the upper surface of one of the ears 58 so that during this amount of tilting movement of the stud member the wear, if any, occurs between the exterior surface of the ball portion of the stud and the interior surface of the bearing seat member 23. It is also to be noted from an examination of Figure 5 that after the stud is tilted to a greater angle than that shown in dotted lines the stud member will carry with it the bearing seat member 23 through contact with the ears 58 so that during extreme tilting movements of the stud member the wear will occur between the exterior surface of the bearing seat member 23 and the interior spherical surface 22 of the housing. In this manner the wear which may result during continued operation of the joint due to tilting movements of the stud will be apportioned to two separate sets of bearing surfaces, thus distributing the wear between such sets of bearing surfaces.

The above described arrangement is such that during rotative movements of the stud under certain conditions of operation, the wear may occur either between the exterior surface of the ball portion of the stud and the interior surface of the bearing seat member or between the exterior surface of the bearing seat member and the interior spherical surface 22 of the housing, or the wear may be distributed over both sets of bearing surfaces depending upon relative frictional components of the several surfaces, which frictional components may vary because of such factors as the tension of the spring, the inertia of the parts effected or caused by shocks or vibratory actions due to road irregularities.

It is to be noted that the bearing seat member is first preferably fabricated as illustrated in Figure 3 with the ear portions 58 extended downwardly and that at the time of the assembly of the bearing seat upon the stud member the ears 58 are bent inwardly and laterally thus preventing dislodgment of the bearing seat member with respect to the stud member, yet through the provision of the space S between the lower portion of the stud member and the ears there is permitted a relative movement between the stud member and the bearing seat member for the purposes hereinbefore explained.

During the fabrication of the bearing seat member 23 the bearing surfaces of the seat, viz., the major body portion of the member is hardened by suitable heat treatment to provide hard wear resisting bearing surfaces, while the projections or ears 58 are left comparatively soft so that they may be readily bent into final assembled position as shown in Figures 1 and 5 without being broken.

In the housing structure as shown in Figure 6, the side wall may be provided with a threaded opening 60 to receive a lubricating fitting 61 as a modified form of means for injecting lubricant into the joint construction.

It is apparent that within the scope of the invention, modifications and different arrangements may be made other than is herein disclosed, and the present disclosure is illustrative merely, the invention comprehending all variations thereof.

What I claim is:

1. In combination, a tie rod; a joint housing connected to said tie rod and having a passage therethrough about an axis transverse with respect to the longitudinal axis of the tie rod; a portion of the wall of said passage being of curved configuration; a stud member having a semi-spherical portion projecting into the passage in said housing; a bearing seat member interposed between the spherical portion of said stud member and the curved interior surface in said housing, said bearing member having portions projecting beneath said stud member and arranged to provide limited relative movement between said stud member and said bearing seat; and means normally urging said bearing surfaces into constant engagement.

2. In combination, a tie rod; a joint housing connected to said tie rod and having a passage therethrough about an axis transverse with respect to the longitudinal axis of the tie rod; a portion of the wall of said passage being of spherical configuration; a stud member having a semi-spherical portion projecting into the passage in said housing; a bearing seat member interposed between the spherical portion of said stud member and the spherical interior surface in said housing, said bearing member having portions projecting beneath said stud member and arranged to provide limited relative movement between said stud member and said bearing seat; spring means normally urging said stud member, bearing seat and interior housing wall in proper relationship, said stud member and bearing seat having openings to receive a lubricant; and a lubricant injecting fitting associated with said housing for injecting lubricant into said joint structure.

3. In combination, a joint housing having a passage therethrough; a portion of the wall of said passage being of curved configuration; a stud member having a semi-spherical portion projecting into the passage in said housing; a bearing seat member interposed between the spherical portion of said stud member and the curved interior surface of said housing, said bearing member having spaced projections extending inwardly beneath said stud member and arranged to provide limited relative movement between said stud member and said bearing seat; means normally urging said stud member, bearing seat and interior housing wall in proper relationship, said bearing seat member having its inner and outer bearing surfaces hardened, said spaced projections being maintained in relatively soft and bendable condition.

REYNOLD E. KLAGES.